United States Patent
Peng et al.

(10) Patent No.: US 8,554,969 B2
(45) Date of Patent: Oct. 8, 2013

(54) ELECTRONIC DEVICE WITH EXPANSION CARD

(75) Inventors: Wen-Tang Peng, New Taipei (TW); Hai-Chen Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 137 days.

(21) Appl. No.: 13/228,450

(22) Filed: Sep. 9, 2011

(65) Prior Publication Data

US 2013/0007328 A1 Jan. 3, 2013

(30) Foreign Application Priority Data

Jun. 28, 2011 (CN) .......................... 2011 1 0176812

(51) Int. Cl.
*G06F 13/00* (2006.01)
(52) U.S. Cl.
USPC ......................................... 710/301; 361/760

(58) Field of Classification Search
USPC ................. 710/301; 361/728, 730, 733, 736, 361/741, 742, 748, 752, 753, 756, 758, 760
See application file for complete search history.

(56) References Cited

U.S. PATENT DOCUMENTS

| | | | | |
|---|---|---|---|---|
| 5,793,998 | A * | 8/1998 | Copeland et al. | 710/305 |
| 5,815,377 | A * | 9/1998 | Lund et al. | 361/802 |
| 2005/0130501 | A1* | 6/2005 | Timmins et al. | 439/637 |
| 2007/0242442 | A1* | 10/2007 | Dai | 361/801 |
| 2011/0197005 | A1* | 8/2011 | Liao et al. | 710/301 |
| 2012/0099287 | A1* | 4/2012 | Wu et al. | 361/781 |

* cited by examiner

*Primary Examiner* — Glenn A Auve
(74) *Attorney, Agent, or Firm* — Altis & Wispro Law Group, Inc.

(57) ABSTRACT

An electronic device includes an enclosure and a motherboard arranged at a middle portion in the enclosure. A first conversion card and a second conversion card are electrically connected to the motherboard. A first expansion card is electrically connected to the first conversion card and above the motherboard. A second expansion card is electrically connected to the second conversion card and below the motherboard.

11 Claims, 4 Drawing Sheets

ELECTRONIC DEVICE WITH EXPANSION CARD

BACKGROUND

1. Technical Field

The disclosure relates to electronic devices and, more particularly, to an electronic device having expansion cards.

2. Description of Related Art

Electronic devices, such as servers, need more and more expansion cards to expand functions. However, the traditional layout in electronic devices cannot satisfy the increased needs.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
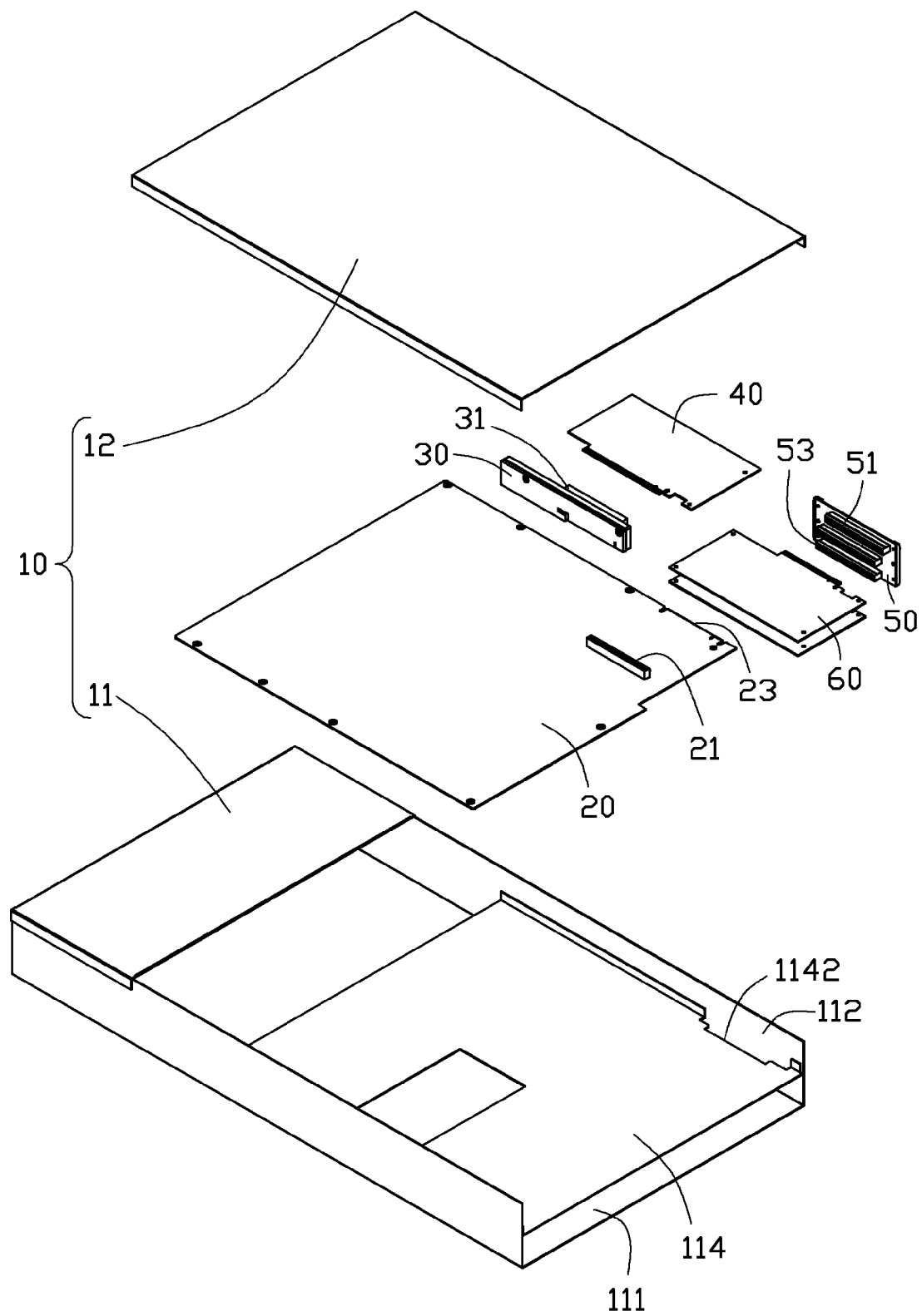
FIG. 1 is an exploded, isometric view of an embodiment of an electronic device.
Figure 2:
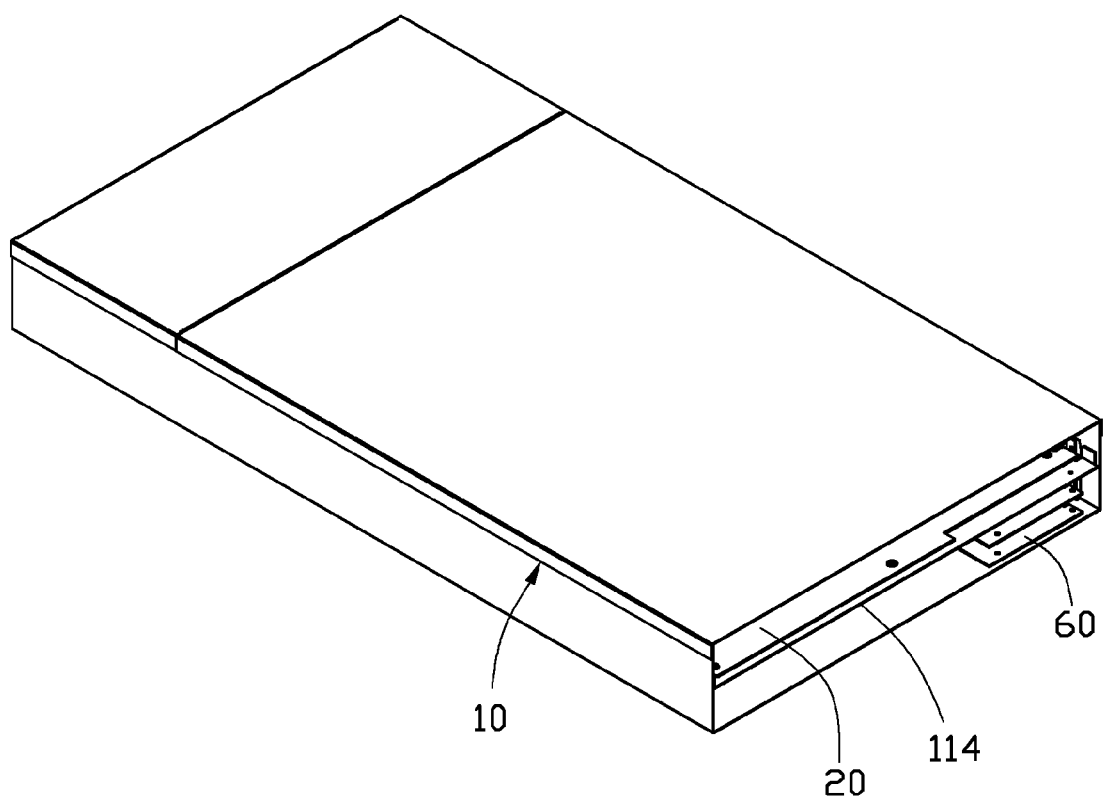
FIG. 2 is an assembled, isometric view of FIG. 1.

Referring to FIGS. 1 and 2, an exemplary embodiment of an electronic device includes an enclosure 10, a motherboard 20, a first conversion card 30, a first expansion card 40, a second conversion card 50, and two second expansion cards 60.

The enclosure 10 includes a box shaped main body 11, and a cover 12. The main body 11 includes a bottom plate 111 and two side plates 112 extending up from two opposite sides of the bottom plate 111. The cover 12 covers the tops of the side plates 112 to form a receiving space together with the main body 11. The enclosure 10 further includes a supporting plate 114 apart from and parallel to the bottom plate 111. The supporting plate 114 is connected between middles of the side plates 112, to divide the receiving space into an upper portion and a lower portion. A cutout 1142 is defined in the supporting plate 114, adjacent to one of the side plates 112.

The motherboard 20 is supported on the supporting plate 114. A socket 21 is arranged on the motherboard 20 opposite to the supporting plate 114. An edge connector 23 is set on one edge of the motherboard 20.

Figure 3:
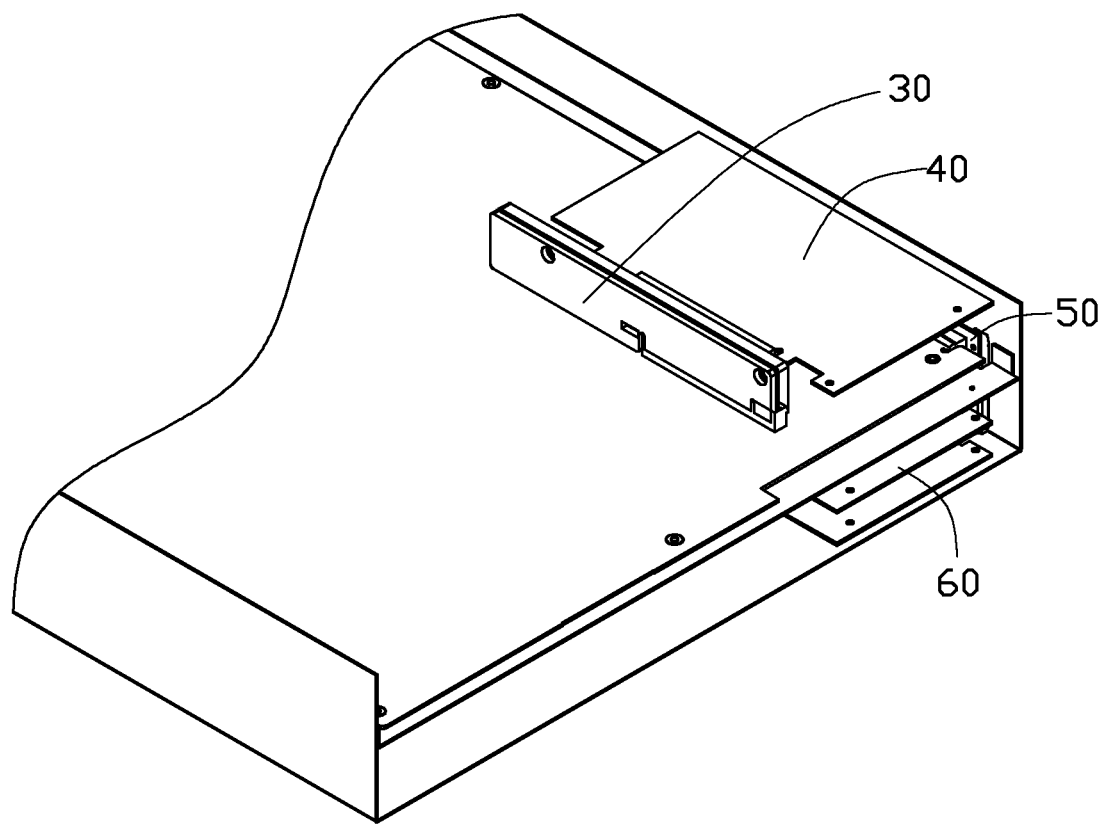
FIG. 3 is a partial, enlarged view of FIG. 2, with certain components omitted.
Figure 4:
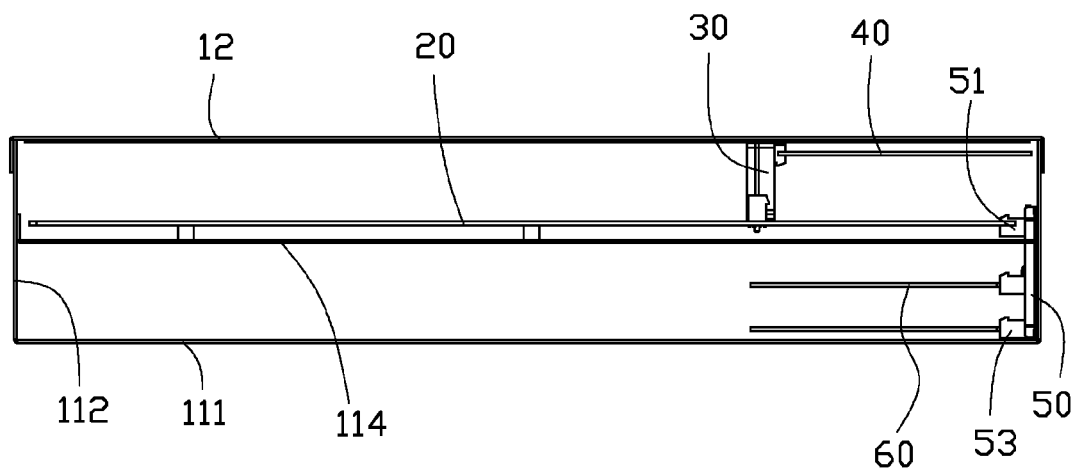
FIG. 4 is a side plan view of FIG. 2.

Referring to FIGS. 3 and 4, the first conversion card 30 is plugged into the socket 21 to be electrically connected to the motherboard 20. The first conversion card 30 includes a first expansion slot 31 formed on a first side of the first conversion card 30. The first expansion card 40 is plugged into the first expansion slot 31 and is parallel to the motherboard 20. Obviously, the first conversion card 30 may include more expansion slots to connect more first expansion cards 40.

A plugging slot 51 is horizontally arranged on a first side of the second conversion card 50. A plurality of second expansion slots 53 is horizontally arranged on the first side of the second conversion card 50, below the plugging slot 51. The edge connector 23 of the motherboard 20 is plugged into the plugging slot 51. The second conversion card 50 is perpendicular to the motherboard 20. The second conversion card 50 extends through the cutout 1142 to position the plurality of second expansion slots 53 below the supporting plate 114. The second expansion cards 60 are plugged into the second expansion slots 53, respectively.

In this embodiment, the motherboard 20 is arranged in a middle portion of the enclosure 10, to connect more expansion cards above or below the motherboard 20, which is convenient for expansion.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device comprising:
   an enclosure;
   a motherboard arranged at a middle portion in the enclosure, the motherboard comprising a socket set on a first side of the motherboard and an edge connector set on one edge of the motherboard;
   a first conversion card connected to the socket of the motherboard and located on the first side of the motherboard;
   a first expansion card connected to the first conversion card;
   a second conversion card connected to the edge connector of the motherboard; and
   a second expansion card connected to the second conversion card and positioned under a second side of the motherboard opposite to the first side.

2. The electronic device of claim 1, wherein the enclosure comprises a main body, the main body comprises a bottom plate and two side plates extending up from two opposite sides of the bottom plate, a supporting plate is parallel to the bottom plate and connected between middles of the side plates, the motherboard is supported on the supporting plate.

3. The electronic device of claim 2, wherein the supporting plate defines a cutout adjacent to one of the side plates, the second conversion card extends through the cutout.

4. The electronic device of claim 3, wherein the second conversion card comprises a plugging slot horizontally arranged on a first side of the second conversion card, and an expansion slot horizontally arranged on the first side of the second conversion card below the plugging slot, the edge connector of the motherboard is plugged into the plugging slot to make the second conversion card perpendicular to the motherboard, the second conversion card extends through the supporting plate to position the expansion slot below the supporting plate, the second expansion card is plugged into the expansion slot.

5. The electronic device of claim 1, wherein the first conversion card is perpendicularly connected to the motherboard.

6. The electronic device of claim 1, wherein the second conversion card is perpendicularly connected to the motherboard.

7. An electronic device comprising:
- an enclosure comprising a main body and a supporting plate, wherein the main body comprises a bottom plate, the supporting plate is fixed to the main body, and spaced from and parallel to the bottom plate;
- a motherboard supported on a side of the supporting plate away from the bottom plate;
- a first conversion card electrically connected to a first side of the motherboard which is away from the supporting plate;
- a first expansion card connected to the first conversion card;
- a second conversion card electrically connected to the motherboard; and
- a second expansion card connected to the second conversion card and located below the supporting plate and opposite to the first side.

8. The electronic device of claim 7, wherein the main body comprises two side plates extending up from two opposite sides of the bottom plate, the supporting plate is connected between middles of the side plates.

9. The electronic device of claim 8, wherein the supporting plate defines a cutout adjacent to one of the side plates, the second conversion card extends through the cutout.

10. The electronic device of claim 9, wherein the motherboard comprises a socket set on the first side of the motherboard and an edge connector set on one edge of the motherboard, the first conversion card is connected to the socket, the edge connector is plugged into the second conversion card.

11. The electronic device of claim 10, wherein the second conversion card comprises a plugging slot horizontally arranged on a side of the second conversion card and a second expansion slot horizontally arranged on the side of the second conversion card below the plugging slot, the second conversion card is perpendicular to the motherboard, the second expansion slot is located below the supporting plate and opposite to the first expansion card, the second expansion card is plugged into the second expansion slot.

* * * * *